United States Patent [19]

Bahr et al.

[11] 4,419,392

[45] Dec. 6, 1983

[54] PROCESS FOR PRODUCING COMPACT LACQUER LAYERS FOR RECORD CARRIERS

[75] Inventors: Dietrich J. Bahr, Herrenberg; Marian Briska, Böblingen, both of Fed. Rep. of Germany

[73] Assignee: International Business Machines Corporation, Armonk, N.Y.

[21] Appl. No.: 385,152

[22] Filed: Jun. 4, 1982

[30] Foreign Application Priority Data

Aug. 21, 1981 [DE] Fed. Rep. of Germany ..................... 81106496[U]

[51] Int. Cl.³ ......................... B05D 1/36; B05D 7/00; G01D 15/24

[52] U.S. Cl. ............................... 427/404; 106/193 R; 346/135.1; 427/415; 428/532; 428/535

[58] Field of Search .............................. 428/532, 535; 346/135.1; 427/404, 415; 106/193 R

[56] References Cited

U.S. PATENT DOCUMENTS

| | | | |
|---|---|---|---|
| 2,635,970 | 4/1953 | Salo et al. | 428/535 X |
| 2,833,677 | 5/1958 | Baumlein | 428/535 X |
| 3,824,116 | 7/1974 | Anderson et al. | 428/535 X |
| 3,831,179 | 8/1974 | Brill et al. | 346/135.1 X |
| 4,217,596 | 8/1980 | Jung | 346/135.1 |

*Primary Examiner*—Michael R. Lusignan
*Attorney, Agent, or Firm*—Joseph G. Walsh

[57] ABSTRACT

The invention concerns a process for producing compact, cellulose acetobutyrate based lacquer layers with a high degree of dullness for record carriers coated with a metallic or metalliferous layer, wherein high-molecular polysaccharides, having side chains and containing lignin, are admixed with the basic lacquer compound as a filler with a particle size distribution of less than 10 μm and a molecular weight of about $10^6$.

5 Claims, No Drawings

PROCESS FOR PRODUCING COMPACT LACQUER LAYERS FOR RECORD CARRIERS

DESCRIPTION

TECHNICAL FIELD

The invention concerns a process for producing compact, cellulose acetobutyrate based lacquer layers with a high degree of dullness for record carriers coated with a metallic or metalliferous layer.

BACKGROUND ART

For the production of record carriers for electroerosion printers, papers are coated with lacquers which in most cases contain the following pigments.

(a) Carbon black as a black pigment with a very large specific surface and a very small primary grain of about 0.05 μm. Therefore, carbon black must always be incorporated as a secondary grain in the lacquer. However, secondary grains have a low mechanical stability, i.e., they are easily smashed, thus leading to enhanced lacquer wear and pronounced abrasion during printing. Being non-polar, this pigment is only moderately compatible with the cellulose esters of the lacquer. Although penetration into to secondary grains enhances the polymer's internal adhesion to carbon black, it leads to an extraordinarily high degree of shrinkage of the lacquer film during curing.

(b) Black iron oxides are very hard and lead to a very high wear of the electrodes. These pigments form crystals with an atomic lattice structure, which are marked by great hardness and moderate polarity, thus being well compatible with the cellulose acetobutyrate of the lacquer.

(c) The characteristics of the white pigments, such as diatomaceous earth, quartz, and titanium dioxide, are identical with those mentioned under (b), with titanium dioxide having an extraordinarily high covering power, so that redying the lacquer black is difficult.

(d) According to a previous proposal, calcium carbonate was used as a dulling agent and particularly as a means for preventing an undesirable baking at the electrodes. This pigment does not lead to an irregular wear of the electrodes, which has been found to be a serious disadvantage with the pigments under (b) and (c).

$CaCO_3$ has an ion lattice crystal structure and thus a much greater polarity than cellulose acetobutyrate. Although the free —OH-groups in the cellulose acetobutyrate make for a certain degree of compatibility with $CaCO_3$, the surface tension of the solvent and the cellulose acetobutyrate relative to $CaCO_3$ is so high that the calcium carbonate grains on the surface of the lacquer have relatively sharp contours. This is due to the fact that the calcium carbonate grains are covered with a thin layer of cellulose acetobutyrate. As a result, the lacquer film has a low internal cohesion and its oil absorption is much too low. An improvement could be achieved by using a commercially available $CaCO_3$ coated with stearic acid.

(e) Finally, there are high-polymer granulated materials with a grain size distribution in the μm range. However, it is unknown how such materials behave, but it is necessary for such pigments to be well compatible with the polymers of the lacquer and to be totally insoluble in the solvents used, in order to prevent the formation of mixed polymers.

DISCLOSURE OF THE INVENTION

It is the object of the present invention to provide for a process of the above-described kind a new filler and pigment, respectively, which can be admixed to the cellulose acetobutyrate in the basic lacquer compound and which vastly improves the characteristics of the lacquer. The new filler is to ensure in particular that the lacquer has a high thermal stability, that the filler is not smashed by the electrodes, that the filler can be readily dyed, and, finally, that the wear of the electrodes is considerably reduced by admixing a great quantity of this filler. In accordance with the invention, this is accomplished by high-molecular polysaccharides, having side chains and containing lignin, being admixed to the basic lacquer compound as a filler with a particle size distribution of less than 10 μm and a molecular weight of about $10^6$.

For this purpose, the molecular weight of the filler is preferably chosen so high that it is practically insoluble in acetic esters or solvents for the basic lacquer compound. It is particularly advantageous to use straight-chain polysaccharides of high crystallinity, i.e., polysaccharides having a plurality of regions with bundles of polysaccharide molecules extending in the same direction. However, it is particularly advantageous for the filler to consist of very finely dispersed wood meal in which the cellulose and the polyose are arranged in very stable microfibrils with diameters of about 20 μm which are interlinked by lignin. The starting material for such fillers is preferably wood from deciduous trees with a high original density.

Wood suitable for this purpose is pock wood or guaiacum, beech or oak. As a result of its extraordinarily strong internal adhesion to cellulose acetobutyrate, this new filler forms a very compact lacquer film with a remarkably scratch-resistant surface and a surface topography with roughly lenticular mounds, so that a gentle undulation essential for the diffuse scattering of light is obtained. This could be established beyond any doubt by tests under the electron microscope. The close chemical relationship of the materials to be mixed with each other and the slight differences in polarity permit a high filling ratio without exceeding the absorption power of the polymer. Recent experiments have shown that the hardness of cellulose acetobutyrate leads to a relatively high wear of the electrodes in electroerosion printers, and that after outdiffusion of the softener, as a result of the natural ageing process of the lacquer, the degree of abrasion roughly doubles. Use of the new filler has made it possible for the first time to fill the lacquer to such an extent that the wear of the electrode is substantially governed by the filler rather than the lacquer. As the new filler is a rough, non-abrasive material, considerable improvements can be expected.

The new filler ensures the following important characteristics of the lacquer. Depending upon the structure and hardness of the original material, different particle forms and hardnesses can be obtained. In the burnt out areas the new filler has a strong tendency of changing colour. The new filler has a very high thermal stability and is not smashed by the electrodes, as the primary grain is extraordinarily tough. In addition, the new filler can be satisfactorily penetratively dyed. It permits producing an almost transparent film of great roughness on a black substrate, so that the colour of the abraded particles is light.

The ratio of cellulose acetobutyrate to the new filler may be changed over a wide range, depending upon the respective application and the characteristics required and is 5:1 to 1:2 and 1:3, respectively (other pigments may be admixed, if required). It is pointed out that the cellulose acetobutyrate lacquer at a ratio of 3:1 is subject to very little shrinkage.

Admixture of this new filler yields a lacquer which, in addition to having a high degree of dullness, has a high mechanical strength and a high scratch resistance.

We claim:

1. A process for producing a record carrier comprising a substrate, an intermediate layer and a metallic or metalliferous overcoat layer, said process comprising the steps of coating the substrate with an intermediate layer which is a cellulose acetobutyrate based lacquer admixed with a filler which is a high-molecular weight polysaccharide having side chains and containing lignin, and having a particle size distribution of less than 10 μm and a molecular weight of about $10^6$, and then coating said intermediate layer with a metallic or metalliferous layer.

2. The process according to claim 1, characterized in that the molecular weight of the filler is chosen so high that it is practically insoluble in acetic esters or solvents for the basic lacquer compound.

3. The process according to claim 1, characterized in using highly crystalline polysaccharides having a plurality of regions with bundles of polysaccharide molecules extending in the same direction.

4. The process according to claim 1, characterized in that as a filler wooden particles are used, wherein the cellulose and the polyose are arranged in very stable microfibrils with diameters of about 20 μm which are interlinked by lignin.

5. The process according to claim 4, characterized in that wood of a deciduous tree with a high original density is used as a filler.

* * * * *